(12) United States Patent
Gentner

(10) Patent No.: US 12,296,831 B2
(45) Date of Patent: May 13, 2025

(54) COMPUTER-IMPLEMENTED METHOD FOR MAINTAINING A DRIVER'S PERCEIVED TRUST LEVEL IN AN AT LEAST PARTIALLY AUTOMATED VEHICLE

(71) Applicant: TOYOTA MOTOR EUROPE, Brussels (BE)

(72) Inventor: Alexandre Gentner, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 17/633,263

(22) PCT Filed: Aug. 9, 2019

(86) PCT No.: PCT/EP2019/071500
§ 371 (c)(1),
(2) Date: Feb. 7, 2022

(87) PCT Pub. No.: WO2021/028012
PCT Pub. Date: Feb. 18, 2021

(65) Prior Publication Data
US 2022/0281461 A1    Sep. 8, 2022

(51) Int. Cl.
*B60W 40/08* (2012.01)
*B60W 50/14* (2020.01)
*B60W 60/00* (2020.01)

(52) U.S. Cl.
CPC ............ *B60W 40/08* (2013.01); *B60W 50/14* (2013.01); *B60W 60/0013* (2020.02); *B60W 2050/146* (2013.01); *B60W 2540/22* (2013.01); *B60W 2540/221* (2020.02); *B60W 2555/20* (2020.02); *B60W 2556/10* (2020.02)

(58) Field of Classification Search
None
See application file for complete search history.

(56) References Cited

U.S. PATENT DOCUMENTS

| 2014/0236414 A1* | 8/2014 | Droz | G06V 20/58 701/1 |
| 2017/0036673 A1* | 2/2017 | Lee | A61B 5/18 |
| 2017/0217445 A1* | 8/2017 | Tzirkel-Hancock | B60W 50/08 |
| 2017/0225677 A1* | 8/2017 | Yoshida | A61B 5/6893 |
| 2017/0267256 A1* | 9/2017 | Minster | B60W 40/09 |

(Continued)

FOREIGN PATENT DOCUMENTS

| DE | 102016214394 A1 | 2/2018 |
| WO | 2016109635 A1 | 7/2016 |

OTHER PUBLICATIONS

International Search Report and Written Opinion dated Feb. 18, 2021 in related International Application No. PCT/EP2019/071500.

*Primary Examiner* — Aniss Chad
*Assistant Examiner* — Madison R. Inserra
(74) *Attorney, Agent, or Firm* — Dinsmore & Shohl LLP

(57) ABSTRACT

A computer-implemented method for maintaining a driver's perceived trust level in an at least partially automated vehicle, comprising monitoring one or more parameters concerning the driver, the vehicle and/or a surrounding environment; predicting, based on the one or more parameters, a decrease in the perceived trust level; and carrying out one or more countermeasures to compensate for the predicted decrease in the perceived trust level.

20 Claims, 2 Drawing Sheets

(56) References Cited

U.S. PATENT DOCUMENTS

2019/0049957 A1  2/2019  Healey et al.
2019/0126914 A1* 5/2019  Nojoumian .......... G05D 1/0055

* cited by examiner

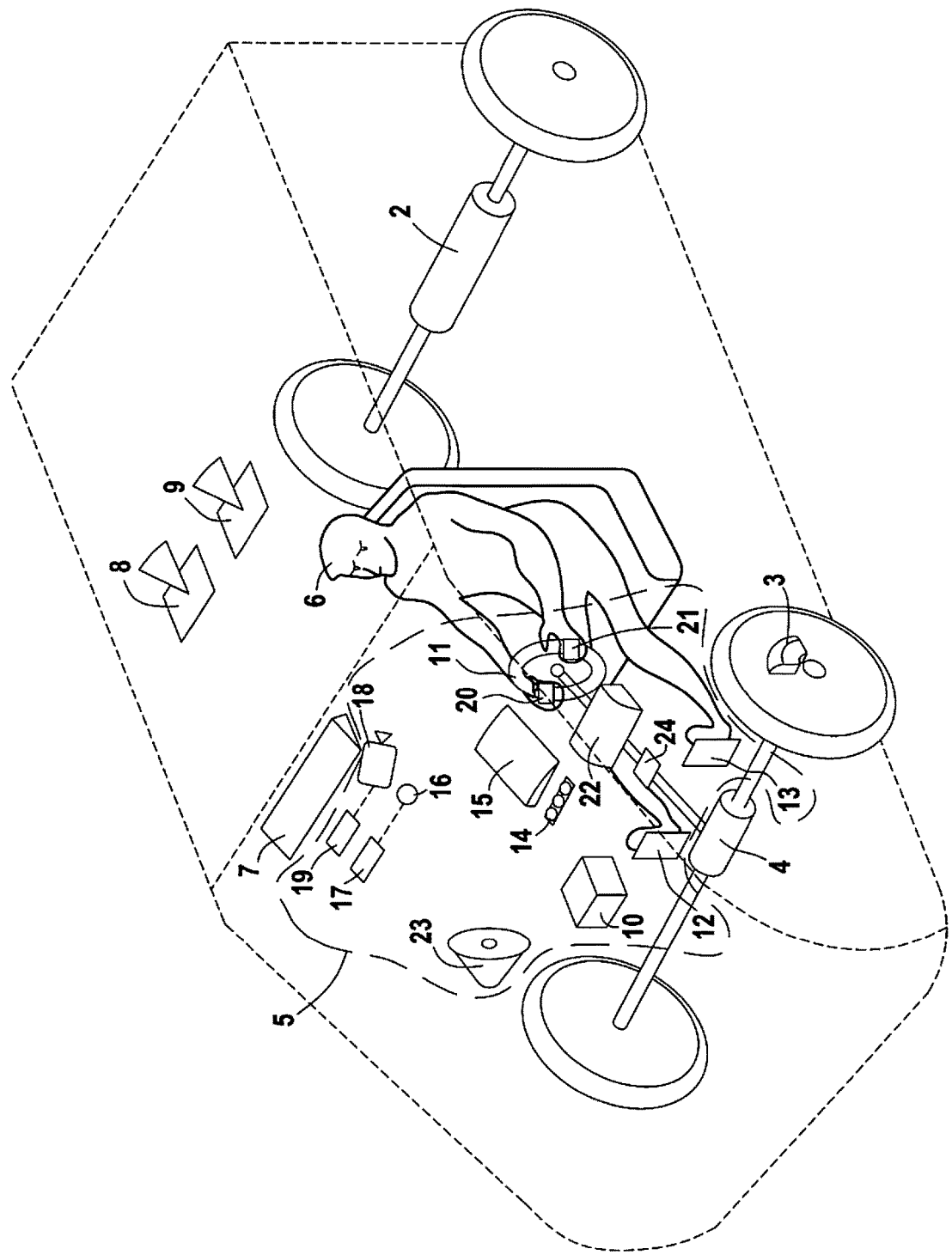

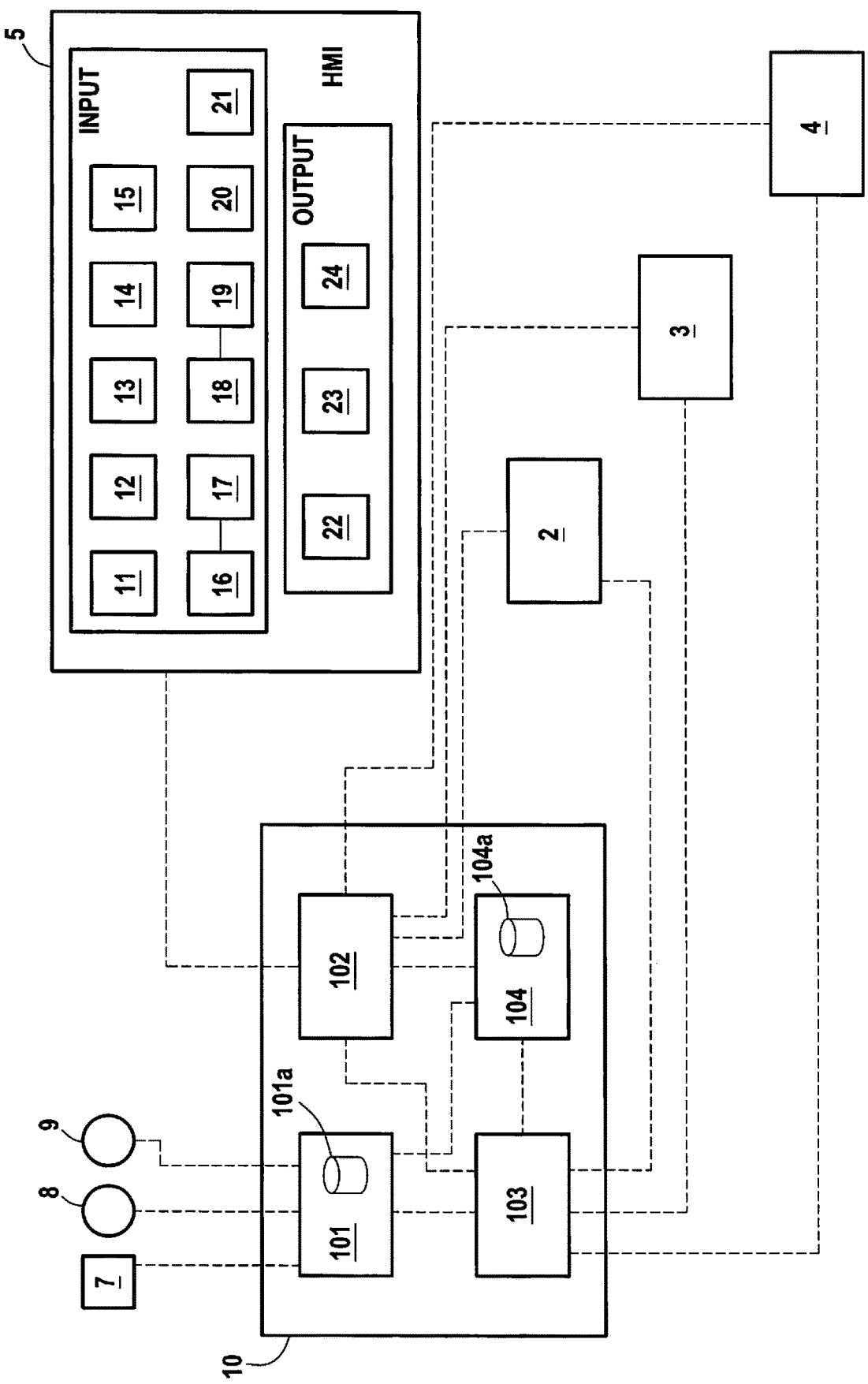
[Fig. 2]

COMPUTER-IMPLEMENTED METHOD FOR MAINTAINING A DRIVER'S PERCEIVED TRUST LEVEL IN AN AT LEAST PARTIALLY AUTOMATED VEHICLE

CROSS-REFERENCE TO RELATED APPLICATIONS

This application is a National Stage of International Application PCT/EP2019/071500 filed on Aug. 9, 2019, the entire contents of which are hereby incorporated by reference.

TECHNICAL FIELD

The disclosure relates to the field of vehicle automation, and in particular to a computer-implemented method for maintaining a driver's perceived trust level in an at least partially automated vehicle

BACKGROUND

In the last years, there has been an increased thrust to increased vehicle automation, with the ultimate aim of achieving full vehicle automation, that is, the full-time performance by an automated vehicle driving system of all aspects of the dynamic driving task under all roadway and environmental conditions that can be managed by a human driver. As defined by the SAE, starting from a level 0 of no automation, wherein the human driver must perform all aspects of the dynamic driving task, even if he may be supported by warning or intervention systems, four automation levels may be reached before attaining the level 5 of full automation.

In a level 1 of driver assistance, a driver assistance system may perform a driving mode-specific execution of either steering or acceleration/deceleration using information about the driving environment and with the expectation that the human driver performs all remaining aspects of the dynamic driving task.

In a level 2 of partial automation, one or more driver assistance systems may perform a driving mode-specific execution of both steering and acceleration/deceleration using information about the driving environment and with the expectation that the human driver performs all remaining aspects of the dynamic driving task.

In a level 3 of conditional automation, an automated driving system may perform a driving mode-specific execution of all aspects of the dynamic driving task with the expectation that the human driver will respond appropriately to a request to intervene.

In a level 4 of high automation, an automated driving system may perform a driving-mode-specific execution of all aspects of the dynamic driving task, even if the human driver does not respond appropriately to a request to intervene.

At each level of at least partial automation, there may be a number of reasons for stopping an automated driving mode.

For instance, as disclosed in U.S. Pat. No. 8,874,301, and US patent application publication nos. 2008/0252466 and 2013/0018549, the vehicle may be brought to an emergency stop if the driver status degrades, if the driver is not responding to a request to take over control, and/or at the driver's request. As also disclosed in U.S. Pat. No. 8,874,301, and US patent application publication nos. 2008/0252466, it is also possible to switch from the automated driving mode to a manual driving mode, wherein the human driver takes over the dynamic driving task, following a request of the driver assistance or automated driving system to the human driver, responding to a decrease of system confidence, e.g. because of sensor input or situational uncertainty, or following a request by the human driver, for example due to a loss of perceived trust of the human driver in the at least partially automated vehicle.

However, this loss of perceived trust in the at least partially automated vehicle depends on the human driver's subjective perception of the execution of the dynamic driving task in the automated driving mode and thus lead to unnecessary switches from the automated driving mode to the manual driving mode, at worst making the automated driving mode entirely redundant.

SUMMARY

A first aspect of the present disclosure relates to a computer-implemented method for maintaining a driver's perceived trust level in an at least partially automated vehicle, so as to prevent unnecessary switches to the manual driving mode.

According to this first aspect, the computer-implemented method may comprise monitoring one or more parameters concerning the driver, the vehicle and/or a surrounding environment; predicting, based on the one or more parameters, a decrease in the perceived trust level; and carrying out one or more countermeasures, such as e.g. adjusting one or more of vehicle dynamic outputs and human-machine interface outputs to the driver, to compensate for the predicted decrease in the perceived trust level.

The subjective perception, by the human driver, of the execution of the dynamic driving task may thus be taken into account and influenced in order to maintain his perceived trust level and prevent unnecessary anxiety and switches to the manual driving mode.

The one or more parameters may in particular comprise information related to one or more of a driver profile, vehicle specifications, traffic, weather and/or road conditions, a driver state, vehicle dynamic outputs and human-machine interface outputs to the driver.

The information related to the driver profile may in particular include stored driver preferences concerning vehicle dynamic outputs and/or human-machine interface outputs to the driver. In this case, the computer-implemented method may also comprise a step of updating the stored driver preferences in response to the predicted decrease in the perceived trust level. The information related to the driver profile may additionally or alternatively include information related to one or more of the driver's propensity to trust the vehicle and the driver's familiarity with the vehicle.

The information related to the vehicle specifications may in particular include information concerning inherent attributes of the vehicle with a potential impact on the perceived trust level, such as e.g. brand image or physical attributes of the vehicle.

The information related to the traffic, weather and/or road conditions may in particular include stored itinerary information and/or information received from one or more vehicle sensors, which may include one or more of a radar, a LIDAR, a camera, an acoustic sensor, a rain sensor and a motion sensor.

The information related to the driver state may comprise physiological information, such as e.g. the driver's electrodermal activity, pulse rate and/or eye activity, received from one or more driver sensors.

The information related to vehicle dynamic outputs may in particular include information related to current and/or upcoming steering, acceleration and/or braking of the vehicle.

The information related to human-machine interface outputs to the driver may in particular include information concerning one or more of purpose, method and sensory channel of one or more current and/or upcoming human-machine interface outputs to the driver.

A second aspect of the present disclosure relates to a computer program comprising a set of instructions that, when carried out by a computer, cause it to carry out the computer-implemented method of the first aspect.

A third aspect of the present disclosure relates to a computer-readable data storage medium comprising a set of instructions that, when carried out by a computer, cause it to carry out the computer-implemented method of the first aspect.

A fourth aspect of the present disclosure relates to a vehicle control system adapted to carry out the computer-implemented method of the first aspect.

A fifth aspect of the present disclosure relates to an at least partially automated vehicle comprising the vehicle control system of the fourth aspect.

The above summary of some example embodiments is not intended to describe each disclosed embodiment or every implementation. In particular, selected features of any illustrative embodiment within this specification may be incorporated into an additional embodiment unless clearly stated to the contrary.

BRIEF DESCRIPTION OF THE DRAWINGS

Embodiments may be more completely understood in consideration of the following detailed description of various embodiments in connection with the accompanying drawings, in which:

FIG. 1 is a schematic drawing of an at least partially automated vehicle.

FIG. 2 is a block diagram of an at least partially automated vehicle.

While the embodiments are amenable to various modifications and alternative forms, specifics thereof have been shown by way of example in the drawings and will be described in detail. It should be understood, however, that the intention is not to limit aspects of the embodiments to the particular embodiments described. On the contrary, the intention is to cover all modifications, equivalents, and alternatives falling within the scope of the embodiments.

DETAILED DESCRIPTION

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the embodiments. The illustrative embodiments depicted are intended only as exemplary. Selected features of any illustrative embodiment may be incorporated into an additional embodiment unless clearly stated to the contrary.

FIG. 1 illustrates schematically an at least partially automated vehicle 1, e.g. of automation level 2 or 3, which may comprise, as illustrated, a powertrain 2, a braking system 3, a steering system 4, a human-machine interface 5 for interacting with a human driver 6, a set of vehicle sensors 7, a positioning system 8, a wireless communication system 9, and a vehicle control system 10.

The powertrain 2 may comprise a combustion engine and/or one or more electric motors, and the braking system 3 may comprise friction and/or electric regenerative brakes.

The human-machine interface 5 may comprise one or more input devices and one or more output devices. The one or more input devices may comprise a steering wheel 11, an accelerator pedal 12, a brake pedal 13, one or more buttons 14, one or more touchscreens 15 and/or one or more driver sensors. The one or more driver sensors may in particular comprise a microphone 16 connected to a voice recognition unit 17, a driver camera 18 connected to an eye tracking unit 19, a pulse rate sensor 20 and/or an electrodermal activity sensor 21. The one or more output devices may comprise one or more visual display units 22, which may include e.g. screens, gauges and/or warning lights, an acoustic output unit 23, and/or a haptic output unit 24.

The set of vehicle sensors 7 may comprise e.g. a camera, LIDAR, radar, acoustic, rain and/or motion sensors.

As illustrated in FIG. 2, the vehicle control system 10 may comprise a first data processing unit 101, a second data processing unit 102, a third data processing unit 103, and a fourth data processing unit 104.

The first data processing unit 101 may be connected to one or more of the set of vehicle sensors 7, the positioning system 8, and the wireless communication system 9, for processing contextual information received therefrom, in particular information related to traffic, weather and/or road conditions. This first data processing unit 101 may comprise a first data storage unit 101a with stored data relating, for instance, to position-related road conditions, so as to process information related to road conditions associated to a current or future itinerary, on the basis of data from the positioning system 8.

The second data processing unit 102 may be connected to the human-machine interface 5 for processing inputs from and outputs to the human driver 6, and in particular information related to the driver's state, received from the one or more driver sensors, and information related to the human-machine outputs to the driver 6. This second data processing unit 102 may also be directly connected to one or more of the powertrain 2, braking system 3, and steering system 4 to transmit thereto the inputs from the human driver 6 in a manual driving mode.

The third data processing unit 103 may be connected to the first data processing unit 101 for receiving the contextual information received from one or more of the set of vehicle sensors 7, the positioning system 8, and the wireless communication system 9, and/or stored in the first data storage unit 101a, and to one or more of the powertrain 2, the braking system 3, and the steering system 4, and adapted to perform a dynamic driving task in an automated driving mode through control outputs to one or more of the powertrain 2, the braking system 3, and the steering system 4 on the basis of the contextual information received from one or more of the set of vehicle sensors 7, the positioning system 8, and the wireless communication system 9, and/or stored in the first data storage unit 101*a*. It may also, as illustrated, be connected to the human-machine interface 5, possibly through the second data processing unit 102, to output information to the human driver 6 about its performance of the dynamic driving task in the automated driving mode, and eventually to request a switch to the manual driving mode by the human driver 6.

The fourth data processing unit 104 may also be connected to the first data processing unit 101 for receiving the contextual information received from one or more of the set of vehicle sensors 7, the positioning system 8, and the wireless communication system 9, and/or stored in the first data storage unit 101*a*, and to the human-machine interface 5, possibly through the second data processing unit 102, for receiving information related to the driver's state, received from the one or more driver sensors, and information related to the outputs of the human-machine interface 5 to the human driver 6, as well as for outputting information through the human-machine interface 5 to the human driver 6. Moreover, the fourth data processing unit 104 may also comprise a second data storage unit 104*a* for storing information relating to a driver profile and vehicle specifications. The driver profile may include information related to one or more of the driver's propensity to trust the vehicle and the driver's familiarity with the vehicle, and/or stored driver preferences concerning vehicle dynamic outputs and/or human-machine interface outputs to the driver. The vehicle specifications may include information concerning inherent attributes of the vehicle with a potential impact on the perceived trust level, such as e.g. brand image or physical attributes of the vehicle. Finally, the fourth data processing unit 104 may be connected to the third data processing unit 103 for receiving, from the third data processing unit 103, information relating to vehicle dynamic outputs, and in particular the control outputs of the third data processing unit 103 to one or more of the powertrain 2, the braking system 3, and the steering system 4, and for transmitting to the third data processing unit 103, adjustments to those vehicle dynamic outputs in response to a predicted decrease of a perceived trust level of the human driver 6 in the at least partially automated vehicle 1.

The fourth data processing unit 104 may more specifically be adapted to execute a computer-implemented method for maintaining the perceived trust level of the human driver 6, when the at least partially automated vehicle 1 is in an automated driving mode.

This computer-implemented method may in particular comprise the steps of monitoring one or more parameters concerning the driver 6, the vehicle 1 and/or a surrounding environment; predicting, based on the one or more parameters, a decrease in the perceived trust level; and carrying out one or more countermeasures to compensate for the predicted decrease in the perceived trust level.

In the first step, the fourth data processing unit 104 may monitor information related to one or more of the driver profile and vehicle specifications stored in the second data storage unit 104*a*, the contextual information such as traffic, weather and/or road conditions received from one or more of the set of vehicle sensors 7, positioning system 8, wireless communication system 9, or first data storage unit 101, through the first data processing unit 101, the driver state and outputs of the human-machine interface 5 to the human driver 6 received from the human-machine interface 5, possibly through the second data processing unit 102, and the vehicle dynamic outputs, such as control outputs to one or more of the powertrain 2, the braking system 3, and the steering system 4, received from the third data processing unit 103.

In the second step, the fourth data processing unit 104 may predict a decrease of the perceived trust level of the human driver 6 in the at least partially automated vehicle 1 on the basis of those parameters, and in the third step, the fourth data processing unit 104 may perform countermeasures, such as adjusting one or more of vehicle dynamic outputs and human-machine interface outputs to the driver, to compensate for the predicted decrease in the perceived trust level. In an additional, fourth step, the information related to the driver profile stored in second data storage unit 104*a*, and in particular the stored driver preferences, may be updated in response to the predicted decrease in the perceived trust level.

For example, the contextual information may indicate a misbehavior (e.g. lane-cutting, zigzagging) of another road user which may be predicted to cause anxiety and a decrease of the perceived trust level of the human driver 6 in the at least partially automated vehicle 1 to deal with the situation. As countermeasures, the vehicle dynamic outputs (e.g. steering, braking and/or acceleration) may be adjusted so as to increase the distance to the misbehaving road user and the driver 6 may be informed through the human-machine interface 5 that the misbehavior has been detected and/or that measures are being taken to ensure safety with respect to the misbehaving road user.

In another example, it may be predicted, from one or more of the contextual information, the driver state, the vehicle dynamic outputs and the driver profile, that the driver 6 may perceive the distance to specific static obstacles to be insufficient, which may cause a decrease in the perceived trust level. As countermeasures, the vehicle dynamic outputs may be adjusted so as to increase that distance and the driver 6 may be informed through the human-machine interface 5 that measures are being taken to avoid the obstacle. Additionally, the driver profile may be updated to take into account the driver response to this situation.

In yet another example, it may be predicted, from one or more of the contextual information, the driver state, the vehicle dynamic outputs and the driver profile, that the driver 6 may perceive the distance to other road users in dense traffic to be insufficient, which may cause a decrease in the perceived trust level. As countermeasures, the vehicle dynamic outputs may be adjusted so as to increase that distance and the driver 6 may be informed through the human-machine interface 5 that the automated driving mode is being adjusted, and be invited to adjust his stored preferences regarding vehicle distance.

In a further example, it may be predicted, from one or more of the contextual information, the driver state, the vehicle dynamic outputs and the driver profile, that the driver 6 may perceive the lateral distance to incoming traffic to be insufficient, which may cause a decrease in the perceived trust level. As countermeasures, the vehicle dynamic outputs (in particular the steering control outputs) may be adjusted so as to increase that distance and the driver 6 may be informed through the human-machine interface 5 that the automated driving mode is being adjusted, and the driver profile may be updated to adjust the driver preferences concerning that lateral distance.

In another example, it may be predicted, from one or more of the contextual information, the driver state, the vehicle dynamic outputs and the driver profile, that the driver 6 may perceive the distance to other road users to be insufficient in view of current circumstances, e.g. low visibility conditions, which may cause a decrease in the perceived trust level. As countermeasures, the vehicle dynamic outputs may be adjusted, e.g. the speed of the vehicle may be decreased, while the driver 6 may be informed through the human-machine interface 5 that the automated driving mode is being adjusted to account for the current circumstances, and that the quality of the vehicle sensor inputs remains satisfactory.

In yet another example, it may be predicted, from one or more of the contextual information, the driver state, the vehicle dynamic outputs and the driver profile, that the driver 6 may perceive the response to stop-and-go traffic as too smooth, leading to being overtaken by other road users, which may also cause a decrease in the perceived trust level. As countermeasures, the vehicle dynamic outputs may be adjusted so as to increase their reactivity, while the driver 6 may be informed through the human-machine interface 5 that the automated driving mode is being adjusted, and the driver profile may be updated to adjust the driver preferences.

In a further example, it may be predicted, from one or more of the driver state and the driver profile, that the outputs of the human-machine interface 5 to the driver 6 may be perceived as confusing, which may also cause a decrease in the perceived trust level. As countermeasure, the outputs of the human-machine interface 5 to the driver 6 may be adjusted, by providing the driver 6 with additional, complementary information and/or by omitting unnecessary information.

Finally, in a wide array of circumstances, in particular if the driver 6 has been identified as being subject to frequent drops in the perceived trust level, a further decrease of the perceived trust level may be predicted on the basis of the one or more parameters concerning the driver 6, the vehicle 1 and/or the surrounding environment, and as countermeasure, the driver 6 may be suggested to relax, e.g. by activating a relaxation mode, using for instance multisensory stimulation through the human-machine interface 5.

Those skilled in the art will recognize that the present disclosure may be manifested in a variety of forms other than the specific embodiments described and contemplated herein. Accordingly, departure in form and detail may be made without departing from the scope of the present disclosure as described in the appended claims.

The invention claimed is:

1. A method for maintaining a driver's perceived trust level in an at least partially automated vehicle, comprising:
 monitoring parameters concerning the driver, the parameters comprising information related to a driver profile, including stored driver preferences concerning vehicle dynamic outputs and human-machine interface outputs to the driver;
 predicting, based on the parameters, a decrease in the perceived trust level;
 carrying out one or more countermeasures to compensate for the predicted decrease in the perceived trust level;
 updating the stored driver preferences in response to the predicted decrease in the perceived trust level;
 detecting and monitoring contextual information indicating misbehavior of another driver that contributes to the decrease in the perceived trust level, the misbehavior including zigzagging.

2. The method according to claim 1, wherein the parameters concerning the driver further comprise information related to one or more of vehicle specifications, traffic, weather and/or road conditions, and a driver state.

3. The method according to claim 2, wherein the information related to the vehicle specifications includes information concerning inherent attributes of the vehicle with a potential impact on the perceived trust level.

4. The method according to claim 2, wherein the information related to the traffic, weather and/or road conditions include stored itinerary information and/or information received from one or more vehicle sensors.

5. The method according to claim 4, wherein the one or more vehicle sensors include one or more of a radar, a LIDAR, a camera, an acoustic sensor, a rain sensor and a motion sensor.

6. The method according to claim 2, wherein the information related to the driver state comprises physiological information received from one or more driver sensors.

7. The method according to claim 6, wherein the physiological information includes one or more of the driver's electrodermal activity, pulse rate and eye activity.

8. The method according to claim 2, wherein the information related to the human-machine interface outputs to the driver includes information concerning one or more of purpose, method and sensory channel of one or more current and/or upcoming human-machine interface outputs to the driver.

9. The method according to claim 1, wherein the information related to the driver profile includes information related to one or more of driver's propensity to trust the vehicle and driver's familiarity with the vehicle.

10. The method according to claim 1, wherein the stored driver preferences concerning the vehicle dynamic outputs relate to current and/or upcoming steering, acceleration and/or braking of the vehicle.

11. The method according to claim 1, wherein the one or more countermeasures comprise adjusting one or more of the vehicle dynamic outputs and the human-machine interface outputs to the driver.

12. A vehicle control system adapted to carry out the method of claim 1.

13. An at least partially automated vehicle comprising the vehicle control system according to claim 12.

14. The method according to claim 1, further comprising adjusting, in response to the monitoring of the contextual information, the vehicle dynamic outputs so as to adjust a distance relative to the another driver.

15. The method according to claim 14, further comprising notifying, via the human-machine interface outputs, the driver that the misbehavior has been detected.

16. The method according to claim 1, further comprising notifying that a countermeasure is being undertaken in response to the detection of the misbehavior.

17. The method according to claim 1, wherein the contextual information is received from one or more vehicle sensors, a positioning system, a wireless communication system, and a data storage unit.

18. A non-transitory computer-readable data storage medium comprising a set of instructions that, when carried out by a computer, cause it to perform:
 monitoring parameters concerning a driver, the parameters comprising information related to a driver profile, including stored driver preferences concerning vehicle dynamic outputs and human-machine interface outputs to the driver;
 predicting, based on the parameters, a decrease in a perceived trust level;
 carrying out one or more countermeasures to compensate for the predicted decrease in the perceived trust level;

updating the stored driver preferences in response to the predicted decrease in the perceived trust level; and detecting and monitoring contextual information indicating misbehavior of another driver that contributes to the decrease in the perceived trust level, the misbehavior including zigzagging.

19. The non-transitory computer-readable data storage medium according to claim 18, wherein the set of instructions, when carried out by the computer, further cause the computer to perform adjusting, in response to the monitoring of the contextual information, the vehicle dynamic outputs so as to adjust a distance relative to the another driver.

20. The non-transitory computer-readable data storage medium according to claim 19, wherein the set of instructions, when carried out by the computer, further cause the computer to perform notifying, via the human-machine interface outputs, the driver that the misbehavior has been detected.

* * * * *

UNITED STATES PATENT AND TRADEMARK OFFICE
CERTIFICATE OF CORRECTION

| | | |
|---|---|---|
| PATENT NO. | : 12,296,831 B2 | Page 1 of 1 |
| APPLICATION NO. | : 17/633263 | |
| DATED | : May 13, 2025 | |
| INVENTOR(S) | : Alexandre Gentner | |

It is certified that error appears in the above-identified patent and that said Letters Patent is hereby corrected as shown below:

On the Title Page

Item (73), assignee, city, delete "Toyota" and insert --Aichi-ken--, therefor.

In the Specification

In Column 1, Line(s) 19, after "vehicle", insert --.--.

Signed and Sealed this
Twenty-second Day of July, 2025

Coke Morgan Stewart
*Acting Director of the United States Patent and Trademark Office*